UNITED STATES PATENT OFFICE.

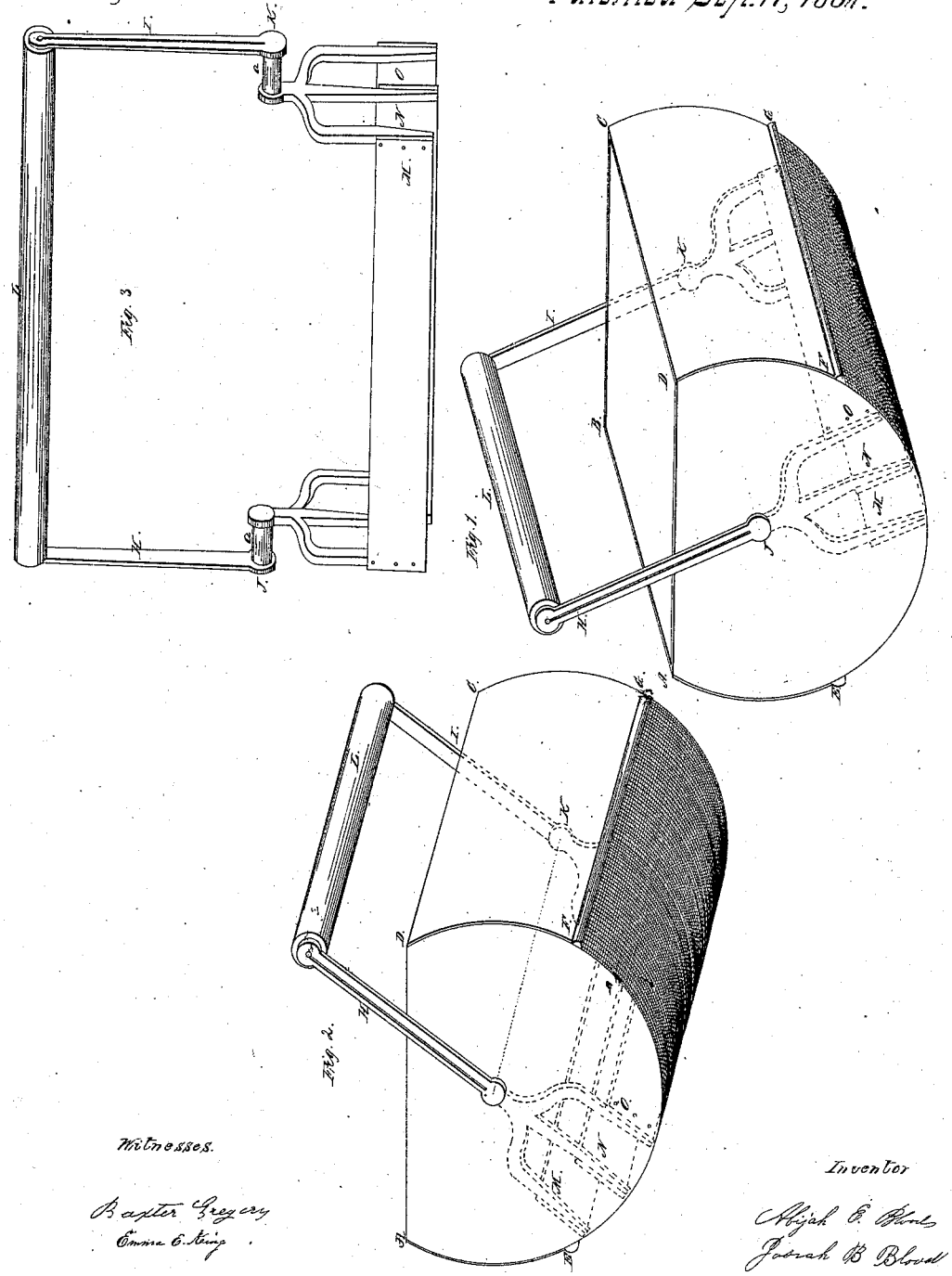

ABIJAH E. BLOOD AND JOSIAH B. BLOOD, OF LYNN, MASSACHUSETTS.

IMPROVED FLOUR-SIFTER.

Specification forming part of Letters Patent No. 33,293, dated September 17, 1861.

*To all whom it may concern:*

Be it known that we, ABIJAH E. BLOOD and JOSIAH B. BLOOD, of Lynn, in the county of Essex, in the State of Massachusetts, have invented a new and Improved Portable Flour and Meal Sifter; and we do hereby declare that the following is a full and exact description thereof, reference being had to the accompanying drawings, and to the letters of reference marked thereon.

Our invention consists of a cylindrical box or case which is adapted to enter and rest upon the top of a suitable box, firkin, or other receptacle, being sustained upon the two side strips or cleats E F G. The space between these cleats below, amounting to about one-third of the circumference, is covered with the common wire mesh for sifting, and the corresponding upper third opposite is left open for the introduction of the material to be sifted. This opening can be provided with a cover, or not, as required. Two levers H I pass downward from the handle L, which connects them, as far as the line of the center of the cylindrical case at J K. Then turning at right angles and passing inward they form the bearing shown at $a\ a$, Figure 3, and then bending downward again terminate in two forks of two or more parts each, which carry flat boards or scrapers M N O, extending along the inside of the wire-cloth within a short distance of its surface. On the handle L being moved reciprocally the scrapers M N O will pass in like manner over the mesh of the sieve, spreading and agitating the contents and forcing them rapidly through into the receptacle below.

What we claim as our invention, and desire to secure by Letters Patent, is—

The combination and arrangement of the cylindrical sieve with scrapers M N O and levers H I, all substantially as and for the purpose set forth.

ABIJAH E. BLOOD.
JOSIAH B. BLOOD.

Witnesses:
BAXTER GREGORY,
EMMA E. KING.